(12) United States Patent
Fitz (10) Patent No.: US 7,123,801 B2
(45) Date of Patent: Oct. 17, 2006

(54) OPTICAL FIBER CABLE WITH FIBER RECEIVING JACKET DUCTS

(75) Inventor: Jon Fitz, West Columbia, SC (US)

(73) Assignee: Prysmian Communications Cables and Systems USA, LLC, Lexington, SC (US)

( * ) Notice: Subject to any disclaimer, the term of this patent is extended or adjusted under 35 U.S.C. 154(b) by 110 days.

(21) Appl. No.: 10/992,459

(22) Filed: Nov. 18, 2004

(65) Prior Publication Data

US 2006/0104579 A1    May 18, 2006

(51) Int. Cl.
*G02B 6/44*    (2006.01)

(52) U.S. Cl. .................... 385/105; 385/100; 385/102; 385/103; 385/106; 385/109; 385/110; 385/112; 385/113

(58) Field of Classification Search ............... 385/100, 385/102–113
See application file for complete search history.

(56) References Cited

U.S. PATENT DOCUMENTS

| | | | | |
|---|---|---|---|---|
| 4,408,828 A | 10/1983 | LeNoane et al. | ........ | 350/96.23 |
| 4,730,894 A | 3/1988 | Arroyo | .................... | 350/96.23 |
| 4,899,988 A | 2/1990 | Mills | ........................... | 254/292 |
| 4,902,097 A * | 2/1990 | Worthington et al. | ........ | 385/103 |
| 5,180,890 A | 1/1993 | Pendergrass et al. | .... | 174/117 F |
| 5,193,134 A | 3/1993 | Pizzorno et al. | ............. | 385/105 |
| 5,210,813 A | 5/1993 | Oestreich et al. | ........... | 385/105 |
| 5,218,659 A * | 6/1993 | Schneider | .................... | 385/110 |
| 5,222,178 A | 6/1993 | Betker et al. | ............... | 385/110 |
| 5,388,175 A | 2/1995 | Clarke | ........................ | 385/100 |
| 5,390,273 A | 2/1995 | Rahman et al. | ............. | 385/112 |
| 5,420,955 A | 5/1995 | Cooke et al. | ................ | 385/110 |
| 5,440,659 A | 8/1995 | Bergano et al. | ............. | 385/100 |
| 5,509,097 A | 4/1996 | Tondi-Resta et al. | ........ | 385/113 |
| 5,542,019 A | 7/1996 | Pascher | ....................... | 385/105 |
| 5,668,912 A | 9/1997 | Keller | ......................... | 385/100 |
| 5,802,231 A | 9/1998 | Nagano et al. | .............. | 385/114 |
| 6,137,936 A | 10/2000 | Fitz et al. | .................... | 385/113 |
| 6,654,525 B1 * | 11/2003 | Nechitailo et al. | .......... | 385/103 |
| 2006/0140556 A1 * | 6/2006 | Brown et al. | ................ | 385/100 |

FOREIGN PATENT DOCUMENTS

| | | |
|---|---|---|
| DE | 44 01 079 A1 | 7/1995 |
| EP | 0 284 900 A2 | 10/1988 |
| EP | 0 297 409   * | 1/1989 |
| EP | 0 297 409 A3 | 1/1989 |
| FR | 2 722 029 A | 1/1996 |
| GB | 2114771 A * | 8/1983 |

* cited by examiner

*Primary Examiner*—Frank G. Font
*Assistant Examiner*—Derek L. Dupuis
(74) *Attorney, Agent, or Firm*—Norris, McLaughlin & Marcus

(57) ABSTRACT

Optical fiber cables with a central strength member encircled by a jacket having ducts which are disposed around the strength member and which receive one or more optical fibers with jacket material between the ducts and the outer surface of the jacket. The optical fibers are free to move in the ducts, and preferably, the optical fibers are tight buffered. Portions of the jacket intermediate the ducts connect to the strength member which resists longitudinal movement of the jacket relative to the core. However, the jacket can be separated from the core by manual pulling force after the jacket is axially and radially cut at a pair of diametrically opposite ducts. Preferably, the jacket has outer surface indicia showing the positions of the slots, and the cables can include water blocking materials.

32 Claims, 4 Drawing Sheets

OPTICAL FIBER CABLE WITH FIBER RECEIVING JACKET DUCTS

The invention relates to optical fiber cables having a central strength member encircled by a circumferentially continuous jacket or sheath which has therein at least one longitudinally extending chamber or duct which receives an optical fiber or optical fibers, the jacket being manually separable from the strength member.

BACKGROUND OF THE INVENTION

Optical fiber cables have been widely deployed mainly as trunk lines and rings around cities. The design of such cables was based on long haul or urban loop requirements and optical fiber counts were high, i.e. 24 to 864 and higher fiber counts. Because long distance applications were most common, emphasis was based upon minimizing signal loss. Other factors considered in the designs were the ease of management of large numbers of fibers during access, splicing and storage. Generally, access to a single fiber was not involved because usually splices were made at the terminations of the cable or the splicing involved the branching off of several optical fibers.

One common optical fiber cable design is known as stranded loose tube cable. See, for example, U.S. Pat. No. 5,390,273. In such cables, there is a central strength member around which a plurality of plastic tubes, each loosely receiving a plurality of optical fibers, are wound either helically or in S-Z fashion. The tubes and strength member are encircled by a jacket or sheath which can comprise one or more layers of plastic or of plastic and metal. Such cable provides good protection for the fibers, and when the fiber count is high, organization of the fibers is facilitated since the fibers are distributed among several tubes, e.g. six tubes. However, when the fiber count is low, e.g. two to twelve fibers, multiple tubes are not desirable, not only for cost reasons, but also because for a given cable size, the space within the cable is not efficiently used.

Another common optical fiber cable design is known as a central loose tube cable. See, for example, U.S. Pat. No. 5,509,097. In such cables, a centrally disposed tube, e.g. made of plastic, loosely receives a plurality of optical fibers, and to provide resistance to tensile and contraction forces, strength members are disposed radially outwardly of the tube and usually within a jacket or sheath. The strength members can be yarns, which are not effective for resisting contraction forces, or relatively rigid rods which resist both tensile and contraction forces.

The central loose tube design provides less protection for the optical fibers than the stranded loose tube design, but can be smaller in size and the fibers are easier to access. However, substantial handling of the cable is required to make the fibers available for splicing or connection to other devices, all of the fibers are exposed when the tube is opened which is not desirable if a splice connection to only a single optical fiber is desired, identification of groups is more difficult since the fibers are in one tube and the cable can be less flexible due to the location of the strength members.

Another cable design which is less common in the United States is known as a slotted core cable. See, for example, U.S. Pat. No. 5,193,134. In such cables, there is a core comprising a central strength member encircled by a layer of plastic having a radial thickness sufficient to permit the formation of longitudinal slots or grooves of a size which will loosely receive a plurality of optical fibers in each slot or groove. The slots open outwardly of the core and are closed in the finished cable by a jacket or sheath to form ducts for the optical fibers. Such cables have characteristics similar to the central loose tube cables, but they are difficult to manufacture due to the fact that the optical fibers are fed by fiber pay-offs into the preformed slots. The pay-offs must follow accurately the slots in the core as it is advanced during the feeding of the fibers into the slots while maintaining precise tension control on the fibers. Such conditions can be especially difficult if the slots are S-Z slots, or alternating direction slots which, as is known in the art, are desirable for mid-span access to the fibers.

One of the problems with the slotted core cable when it is to be used for a cable with only a few optical fibers is that only a small reduction in the diameter of the core can be made. Thus, the layer of plastic around the strength member must have a thickness which will not only provide slots of a radial depth and circumferential width sufficient to loosely receive the fibers, but also provide a circumferentially continuous plastic portion inwardly of the slots to prevent separation of the sidewalls of the slots and to maintain the spacing of such sidewalls. For the latter reason, the plastic layer has a minimum radial thickness which is greater than the radial thickness required to provide slots for the fibers.

Because of the tubes, known as buffer tubes, or the slots used, in the designs described hereinbefore, to protect the optical fibers, such designs do not use "tight buffered" fibers. As used herein, "tight buffered" means an optical fiber having, in addition to the layers commonly applied during the manufacture of the fiber, a contacting layer or layers of protective material, such as a polymeric material. Such protective layer or layers increase the outer diameter of the fiber from a typical value of 0.25 mm to from about 0.6 mm to about 0.9 mm. Tight buffered fibers are well known in the art, and because of the tightly encircling layer or layers, the fibers can be handled without further protection, such as buffer tubes or a protective sleeve on an exposed length of fiber.

In all of the cable designs described hereinbefore, the cable usually includes a plastic outer jacket. In order to provide the necessary physical characteristics for the jacket, normally, it must have a radial thickness which is greater than the diameter of an optical fiber.

To provide high speed access of a user's equipment, e.g. at the user's home or business, to the optical fiber cables already installed as trunk or feeder cables, there is a demand for a simple, relatively inexpensive and easy to manufacture cable which can be used to connect the user to the large capacity, high speed cables described hereinbefore. Such a cable is often called a fiber to the home (FTTH) cable. An FTTH cable usually does not need to have more than 12 optical fibers and can have only one optical fiber and typically, is relatively short so that signal loss is not a significant factor. However, an FTTH cable should have the other characteristics of the larger, long distance cables such as ease of handling, ease of access to the fibers, ease of connection of the fibers to other devices, adequate protection of the fibers, flexibility and be adapted to withstand the temperatures of the outdoors. Also, access to a single optical fiber should be convenient without impairing the safety of other optical fibers in the cable. It is known from U.K. Patent Application GB 2,114,771A to provide longitudinally extending compartments in a jacket for loosely receiving an optical fiber, or a bundle of optical fibers, in each compartment. However, the cable disclosed therein is not satisfactory as an FTTH cable not only because the jacket is bonded to the strength member or is integral with a layer of rubber or plastics encircling the strength member so that the jacket cannot be easily separated manually from the strength member, but also because the location of the fiber receiving compartments cannot be readily determined from externally of the cable.

It is apparent from the foregoing description of prior art cables that the foregoing long distance cables cannot provide the characteristics desired for an FTTH cable. The use of a central strength member can provide the strength and flexibility requirements, but if provided with the plastic layer of a size needed for a stranded loose tube or slotted core cable, the diameter of the cable is unnecessarily large and excess plastic material is required. It should be borne in mind that the element used as the core for the strength member need be only about 3–5 mm in diameter and any plastic layer, or "upjacketing", around the element can be omitted if it does not contact the optical fibers, if it does not provide slots for receiving the optical fibers or if it does not provide a form for receiving buffer tubes. If the fibers are to contact the strength member (core element plus plastic layer), the plastic layer can be relatively thin as compared to the thickness of a plastic layer for a loose tube or slotted core cable.

BRIEF DESCRIPTION OF THE INVENTION

After a study of the requirements for an FTTH cable and the prior art cables, it has been discovered that an FTTH cable having the desired characteristics can be provided by encircling a central strength member with a plastic jacket having a circumferentially continuous outer portion and including slots in the jacket intermediate the outer portion and the strength member which form the major portion of ducts for receiving the optical fibers while also providing that the portion of the jacket between the slots and at the central strength member can be manually readily ruptured or separated from the central strength member.

The optical fiber cable of the invention is compact and flexible and provides good protection for the fiber or fibers. The optical signal transmission properties of the cable of the invention are good, and the optical fiber or fibers can be quickly and easily accessed. The cable of the invention can be used both indoors and outdoors. The material costs are relatively low and the manufacturing process is relatively simple.

The cable of the invention has a central strength member which, preferably, has a high tensile strength to resist tensile forces applied to the cable and which, preferably, has a high resistance to longitudinal compression forces to resist contraction of the cable with lowering temperatures. The strength member can be a steel wire or epoxy impregnated glass fibers or rods, and optionally, the strength member comprises such a wire or rod covered by a layer of plastic, a layer of water blocking tape or a layer of such tape over such plastic layer. Such layer does not, or such layers do not, have to have a thickness sufficient to provide slots or grooves, (hereinafter "slots") as in the slotted core cable. As used herein, "strength member" means such a wire, rod or glass fibers either with or without one or more of such layers. In the preferred embodiment of the cable of the invention, the central strength member is encircled by a tubular plastic jacket having longitudinal slots which open toward the strength member for receiving one or more optical fibers. The radial distance between the inner and outer surfaces of the jacket is greater than the radial dimensions of the slots and each of the slots is closed at the radially inward side by the strength member. In other words, in the preferred embodiment, the walls of the slots with the outer surface of the strength member form longitudinal ducts in which the optical fiber, or fibers, is or are loosely or slidably received, i.e., the cross-sectional area of the ducts are selected relative to the total of the cross-sectional area of the fiber or fibers (with any coatings) in a duct so that the fibers will not be damaged by cable pulling forces up to 600 pounds or temperature changes which the cable will encounter in storage or in use. For example, the cross-sectional area of a duct can be 1% to 10% greater than the cross-sectional area of the fibers (with any coating) within the duct.

The slots can have various cross-sectional shapes, but preferably, at least the part of the slot wall remote from the strength member is arcuate. Each slot is spaced from a circumferentially adjacent slot so that there is material of the jacket separating the slots from each other.

If the slots or ducts slidably receive, rather than loosely receive, the optical fibers, the cable diameter can be reduced, but in this event, preferably, the optical fibers are tight buffered fibers to avoid fiber damage. When tight buffered fibers are used, the handling, splicing and connecting of the fibers to other devices also is eased because the fibers are protected when they are removed from the slots or ducts.

The slots or ducts can extend helically around the strength member but preferably, the slots or ducts extend around the strength member in S-Z, or alternating lay, fashion. If the optical fibers are not of the tight buffered type, the size of the slots or ducts is greater than the cross-sectional dimension of the fibers therein so that the fibers are loose in the slots. If the optical fibers are of the tight buffered type, the size of the slots or ducts can be such that the fibers are loosely received therein or can be such that the walls of the slots or ducts have sliding engagement with the protection layer of the fibers to permit longitudinal movement of the fibers with respect to the jacket. Each slot or duct normally will receive at least one optical fiber, but not more than 12 optical fibers. Although there can be only one slot or duct, preferably, there is more than one slot or duct and not more than 12 slots or ducts. If there is more than one slot or duct, preferably, the slots or ducts are equally spaced circumferentially of the strength member.

In one preferred embodiment, the portions of the jacket which are circumferentially intermediate the slots and which are at the strength member are not connected to the strength member by bonding or by being integral with the strength member so that, if desired, e.g. to expose all of the optical fibers at an end of the cable, the jacket can readily be peeled away from the strength member after cutting the jacket longitudinally along diametrically opposite lines. However, such portions can weakly adhere to the strength member permitting easy manual separation of the jacket from the strength member, and such portions at least frictionally engage the strength member to resist longitudinal movement of the jacket and circumferential movement of such portions of the jacket with respect to the strength member. Thus, the adhesion between such portions and the strength member preferably is such that the portions and the strength member can be manually and readily separated at the interface therebetween without rupture of the jacket or the material of the strength member adjacent to the interface. If the strength member outer surface is metal or uncoated epoxy impregnated glass fibers, such portions of the plastic jacket can adhere thereto, but the desired manual separation of the jacket and the strength member can be obtained. If the outer surface of the strength member is a plastic, the desired releasability of the jacket from the strength member can be obtained by using a plastic for the jacket which does not bond, or only weakly bonds, to the plastic at the outer surface of the strength member or the plastic at the outer surface of the strength member can be coated with a release agent known in the art and used to prevent a strong bond between plastics.

The adhesion or bond between the portions of the jacket which are circumferentially intermediate the slots and which engage the strength member or the amount of friction between such portions and the strength member should be sufficient not only to resist longitudinal movement of the jacket relative to the strength member with expansion and contraction of the cable with temperature changes, but also to prevent circumferential movement of such portions relative to the strength member when a longitudinal cut is made in the jacket radially of a slot for access to an optical fiber or fibers in a slot. Thus, for protection of optical fibers in slots adjacent to the slot being opened, the portions of the jacket adjacent to the slot being opened should remain in contact with the strength member.

As an alternative to the techniques for permitting easy manual separation of the jacket from the strength member described hereinbefore, said portions of the jacket can have connections with the strength member which are relatively strong provided that the circumferential dimension of each portion at, or near, where each portion joins the strength member is such that it provides the longitudinal and circumferential resistance to movement relative to the strength member described hereinbefore, but permits relatively easy manual rupturing of the portions when the jacket is peeled away from the strength member in the direction radially of the strength member. For example, the circumferential dimension of each portion where it joins the strength member and when the jacket and an outer layer of the strength member are made of polyethylene can be about 0.1 mm to about 0.5 mm, preferably about 0.1 mm to about 0.3 mm, to provide a line of weakening so that it will rupture easily at or near the strength member when the jacket is pulled manually and radially of the strength member.

Preferably, in at least some of the spaces within the slots or ducts which are not occupied by the optical fibers, there is a dry water blocking or absorbing material, such as a known type of water swellable powder or compound or yarn.

Alternatively, or in addition, the layer of plastic of the strength member and/or the jacket can include a moisture swellable compound and/or the optical fiber or fibers can be coated with a moisture swellable compound. When the optical fiber or fibers are coated with a moisture swellable compound, the optical fiber or fibers are less likely to adhere to the jacket or the plastic layer of the strength member.

When the optical fibers are of the tight buffered type, adhesion of the fibers to the jacket and of the strength member can be reduced or eliminated by applying dry powder, such as talc, to the fibers, by selecting different plastics for the jacket and the outer layer of the fibers, e.g. plastics which do not readily bond to each other or which have different melt temperatures, the outer layer of the tight buffered fiber having the higher melt temperature, or by applying a known type of release agent, such as a polytetrafluoroethylene release agent, to the fibers before or during the insertion of the fibers into the slots or ducts.

Preferably, the outer surface of the jacket bears indicia which will identify the location of the slots or ducts in the jacket. Such indicia may be stripes of plastic of a color different from the color of the plastic of the jacket which follow the positions of the slots or ducts within the jacket. For differentiating between slots or ducts, each stripe can have a color different from the colors of the other stripes. Alternatively, the indicia can be grooves in the outer surface which follow the positions of the slots or ducts. Such grooves can be lines of weakening for removing the jacket and/or guides for a cutting tool for cutting the jacket.

Normally, the cable structure of the invention described hereinbefore will provide adequate protection for the optical fibers of an FTTH cable. However, if desired, the jacket can be encircled by a type of sheath which will provide further protection with respect to crushing forces, rodents, etc. For example, the sheath can be a metal sheath which can be smooth or corrugated and which can provide an electrical ground conductor. Also, the sheath can be a mechanically reinforced dielectric material.

DETAILED DESCRIPTION OF PREFERRED EMBODIMENTS

FIGS. 1–4 illustrate, in cross-section, embodiments of the cable of the invention comprising, respectively, eight, six, four and two optical fibers. The cables can include a greater or lesser number of optical fibers, but normally, will not include more than twelve or less than two optical fibers.

Each of the cables 1–4 illustrated in FIGS. 1–4 has a tubular jacket 5 made of a plastic conventional in the art, such as polyvinylchloride or polyethylene. Since the cable of the invention can be used indoors as well as outdoors, preferably, the plastic is a plastic which will meet National Electric Code requirements for thickness, and flame propagation and which is low smoke producing. See, for example, cited U.S. Pat. No. 5,390,273.

Preferably, the diameters of the outer surface of the jackets 5 are kept as small as possible consistent with the required protection of the optical fibers and the required size of the jacket slots hereinafter described. For example, the diameter of the outer surface of the cable 1 can be about 7.9 mm, and the diameter of the outer surfaces of the cables 2–4 can be about 6.9 mm.

Figure 1:
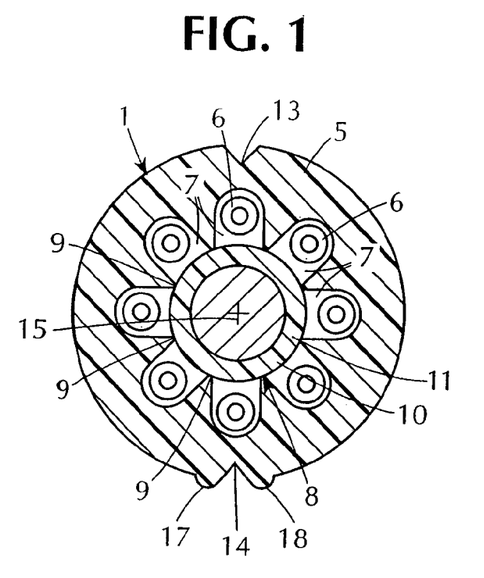
FIGS. 1–4 are cross-sectional views of cables of the invention taken perpendicularly to the axes of the cables.

FIG. 1 illustrates eight tight buffered optical fibers 6 of the type described hereinbefore in eight slots 7 in the jacket 5 which open inwardly toward a strength member 8. Each of the tight buffered optical fibers 6 can have, for example, a glass core encircled by one or more refracting layers which, in turn, are encircled by one or more protective layers of a protective material, such as a polymeric material. The outer diameter of each fiber 6 can be on the order of about 0.6 mm to about 0.9 mm. The wall of the jacket 5 extends radially from the strength member 8 to the outer surface of the jacket 5, and plastic material of the jacket 5 forms the walls of each slot 7 and is disposed between the slots 7 and the outer surface of the jacket 5. Portions 9 of the jacket 5 engage the strength member 8 and connect the jacket 5 to the strength member 8. The portions 9 are at circumferentially opposite sides of each of the slots 7.

In a preferred embodiment of the cable of the invention, there are no more than twelve slots 7 and at least two slots 7, and each slot 7 has one tight buffered optical fiber 6 therein.

The cross-sectional dimension of each slot 7 is selected in relation to the cross-sectional dimension of the optical fiber so that the fiber 6 can move longitudinally with respect to the jacket 5. For example, the slots 7 can have a width w (see FIG. 2) of the order of 1.2 mm when the outer diameter of the optical fiber is on the order of about 0.6 mm to about 0.9 mm. The depth of each slot 7, that is, the distance from the outer surface of the strength member 8 to the outermost arcuate portion of the slot 7, should also be greater than the diameter of the optical fibers and can also be on the order of 1.2 mm.

To prevent the outer layer of tight buffered optical fibers 6 from "sticking" to the jacket 5, several expedients are available. The slots 7 can contain a water blocking material, such as a water swellable powder 12 (see FIG. 6) or a thixotropic jelly known in the art. The fiber 6 can be coated with a release agent of the type described in U.S. Pat. No. 6,137,936. The plastics used for the jacket 5 and the outer layer of the fibers 6 can be selected from plastics which do not stick to each other. If the fibers 6 are received in the slots 7 while the plastic of the jacket 5 is still hot, sticking of the fibers 6 to the jacket 5 can be prevented or reduced by using a plastic for the outer layer of the fibers 6 which has a higher melting temperature than the melting temperature of the plastic of the jacket 5.

As mentioned hereinbefore, an FTTH cable does not need a large number of optical fibers, and it is desirable to use tight buffered optical fibers 6 so that when a fiber is pulled out of the cable or exposed, the fiber can be handled without protection and exposed optical fiber does not need protection, such as a sleeve. However, if desired, each of the slots 7 can have more than one optical fiber therein, and if desired, the slots 7 can have optical fibers therein which are not tight buffered if the advantages of tight buffered optical fibers are not needed.

Figure 5:
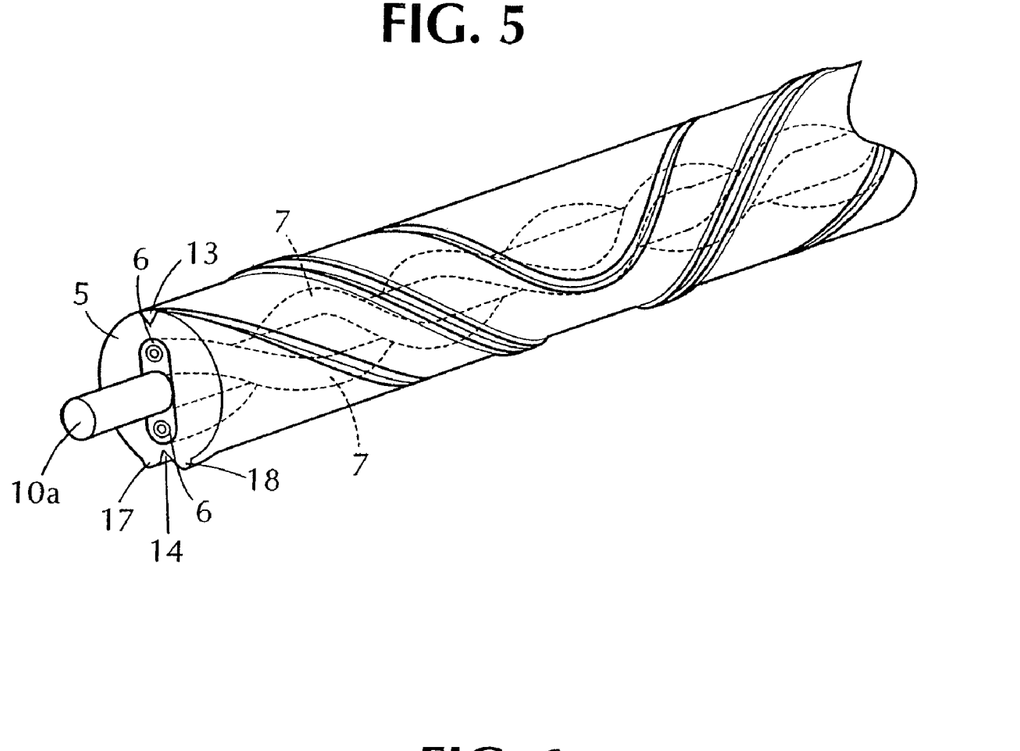
FIG. 5 is a diagrammatic perspective view of the cable illustrated in FIG. 4.

To permit ease of mid-span access to the optical fibers, preferably, the slots 7 follow paths in the jacket 5 which are of alternating lay or S-Z lay as described and illustrated in said U.S. Pat. No. 5,390,273 for the buffer tubes 4–9 and as illustrated in FIG. 5.

The strength member 8 illustrated in FIG. 1 comprises a core 10 and an encircling layer 11 of plastic, the latter being sometimes called an "up-jacket" and included, when necessary, to provide the desired spacing between the slots 7 when the core 10 need not have the diameter required for such spacing. The core 10 is formed by a material of high tensile strength, e.g. a steel wire or rod or epoxy impregnated glass or aramid fibers. Thus, the core 10 provides the required resistance to tensile forces, e.g. up to 600 pounds, encountered during handling, installation and suspension of the cable. Preferably, the core 10 is also able to withstand and resist compression and tension forces caused by temperature changes from −50° C. to 85° C. The temperature coefficient of expansion and contraction of the core 10 is less than such coefficient of the jacket 5 so as to reduce longitudinal expansion and contraction of the jacket 5 connected to the strength member 8 by the portions 9.

Figure 2:
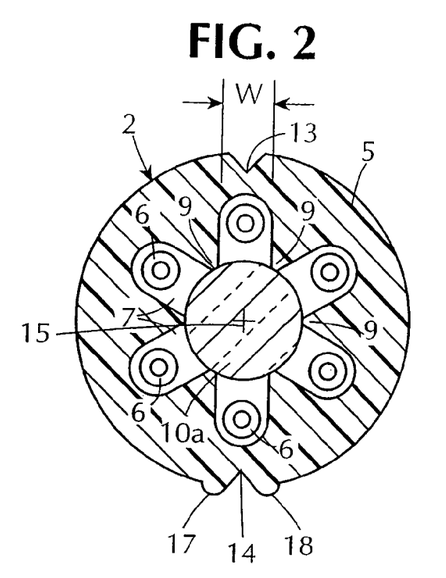
Figure 3:
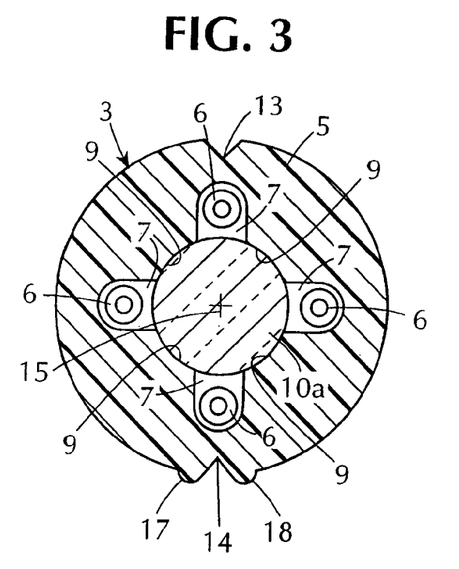
Figure 4:
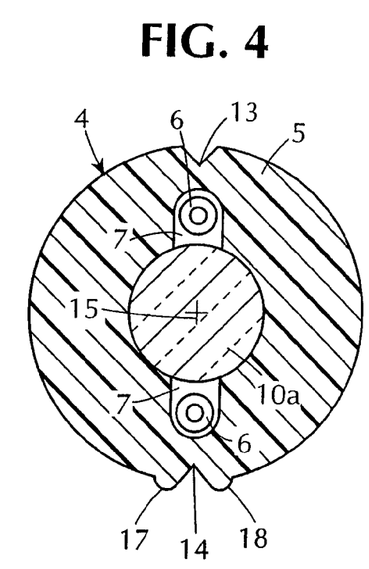

FIG. 1 illustrates the cable 1 with a core 10 with an up-jacket layer 11 of plastic. In FIGS. 2–4, the strength member is a bare core 10a of glass fibers which can be impregnated with an epoxy resin as is known in the art. Such a core 10a has high tensile strength and a low coefficient of expansion and contraction and is resistant to contraction forces.

To avoid damage to the optical fibers 6, the material encircling the optical fibers 6, the jacket 5 in the cable of the invention, should have sufficient connection to the strength member 8 to prevent longitudinal and circumferential movement of such material (the jacket 5) with respect to forces applied to the cable by reason of handling of the cable, temperature changes and suspension of the cable. The major forces normally are the pulling forces during installation of a cable which cause shear stresses at the interface of the portions 9 and the strength member 8 or 10a. Such shear stresses will vary depending on the diameters of the cable components and on the installation methods and tools used. For example, if the optical fiber cable 3 illustrated in FIG. 3 has an outside diameter of 8.1 mm and a strength member with an outside diameter of 3.5 mm is to withstand a maximum pulling load of about 300 pounds when the cable is pulled with conventional cable grip having a length of 225 mm, the maximum shear stress at the interfaces is calculated to be approximately 0.97 $N/mm^2$. Thus, the adhesion between the portions 9 and the strength member 8 or 10a for such a cable must provide a resistance to movement of the portions 9 relative to the strength member 8 or 10a which is greater than 0.97 $N/mm^2$. However, such resistance must be less than the yield or rupture strength of the material of the jacket 5, i.e. should not exceed 90% of such strength and preferably, should not exceed 80% of such strength.

However, it is also desirable that it be simple and easy to expose individual fibers for access thereto intermediate the cable ends for connection of a fiber or fiber to optical equipment. Also, if the cable is to be terminated at an end, it is desirable to be able to expose all the optical fibers at the end in a simple and easy manner. Accordingly, there are the conflicting requirements of a strong connection between the jacket 5 for preventing relative longitudinal movement between the jacket 5 and the strength member 8 and of a manually separable connection between the jacket 5 and the strength member 8.

In the preferred embodiments of the cables of the invention, the materials of the jacket 5 and of the strength member 8 preferably are sized, treated and/or selected so that there is a connection between the portions 9 and the strength member 8 which, by adhesion and/or friction therebetween, prevents longitudinal movement between the jacket 5 and the strength member 8 or 10a when the pulling force on the cable is up to 300 pounds but, nevertheless, permits separation of the jacket 5 from the strength member 8 with manual forces of not more than 100 pounds applied radially away from the strength member 8 or 10a after the jacket 5 has been longitudinally cut along diametrically opposite lines. Preferably, the manual force required to pull the jacket 5 away from the strength member 8 or 10a is not more than about 20 pounds and does not exceed 75 pounds.

For example, if the strength member is made of metal or glass fibers and is bare, i.e. is a core 10a without an encircling layer, and the jacket 5 is made of plastic, the material of the jacket 5 and circumferential length of the portions 9 at the surface of the strength member can be selected so that the desired resistance to longitudinal movement between the jacket 5 and the strength member 8 can be obtained by adhesion and/or the coefficient of friction between the jacket 5 material and the strength member material. The material of the jacket 5 can be, for example, polyvinylchloride or polyethylene. However, the jacket portions can be readily separated from the strength member by manual forces applied to the jacket radially of the cable axis.

As further examples, if the strength member 8 has an up-jacket 11 of plastic, the desired resistance to such longitudinal movement and ease of separation of the jacket 5 from the strength member 8 can be obtained by making the jacket 5 of a plastic which does not bond, or only weakly bonds, to the plastic of the up-jacket, or by coating the outer surface of the up-jacket 11, or the inner surfaces of the portions 9, with a release agent known in the art. The preferred release agent is the Miller Stephenson MS-143 DF, the release agent described in U.S. Pat. No. 6,137,936.

Plastics which do not bond, or which only weakly bond, include those which are immiscible and those which have different melt temperatures. Polar and non-polar plastics are immiscible and, for example, the up-jacket 11 can be formed from a polar plastic and the jacket 5 can be formed from a non-polar plastic or vice versa. Combinations of such plastics which weakly adhere are polyvinylchloride (PVC) and polyethylene (PE), polypropylene (PP) and PVC, PP and polybutylene (PBT), PP and polyethylene terephthalate (PET), PE and PET and PE and PBT. If plastics with different melt temperatures are used, the plastic with the higher melt temperature would be used for the up-jacket 11 and the plastic for the jacket 5 would have a lower melt temperature so that when it is applied it would not cause melting of the up-jacket material and significant mixing of the two plastics. Thus, for example, PBT could be used for the up-jacket 11 and PE or PP for the jacket 5 or PBT or PET as the up-jacket 11 and PVC as the jacket 5.

Figure 9:
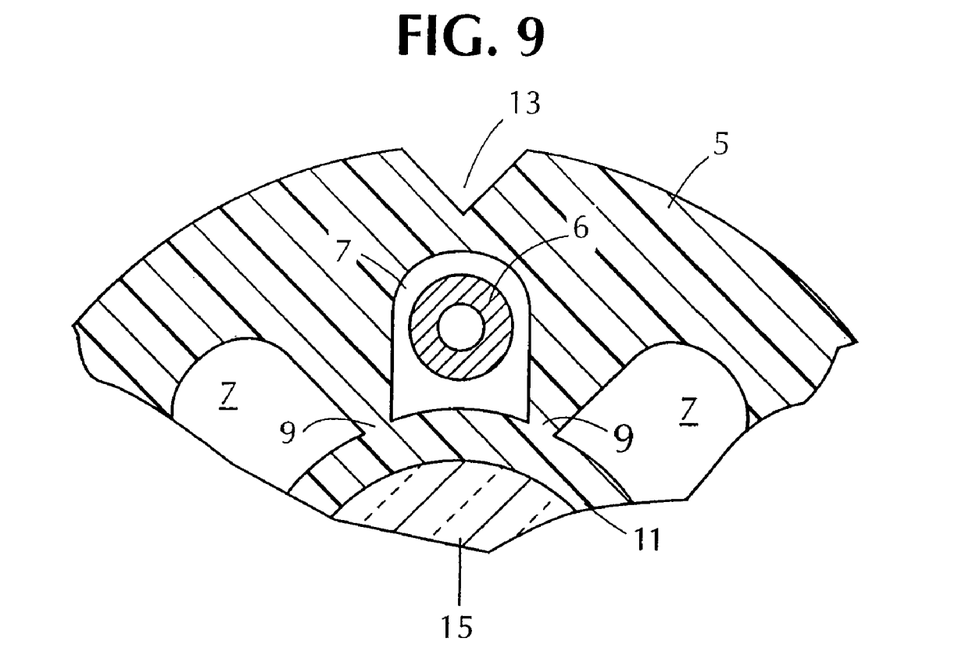
FIGS. 9 and 10 are enlarged, fragmentary, cross-sectional views of modifications of the embodiment shown in FIG. 1 in which the materials of the cable jacket and the up-jacket on the strength member are the same and join the cable jacket with the strength member up-jacket.
Figure 10:
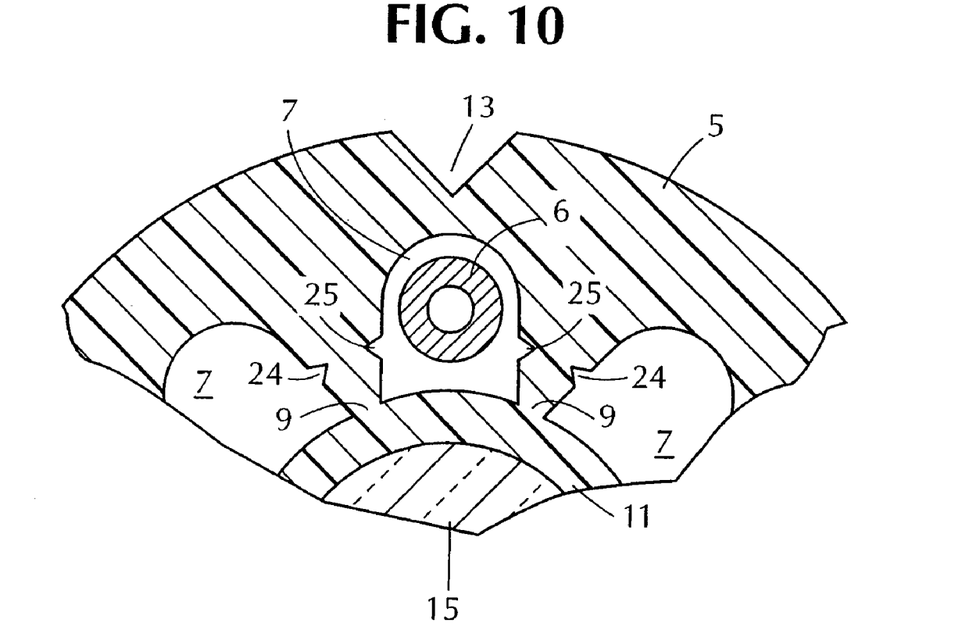

Alternatively, if the strength member 8 has an up-jacket 11 of plastic material which is the same as the plastic material of the jacket 5, as shown in FIGS. 9 and 10, the up-jacket 11 and jacket 5 can be co-extruded so that the portions 9 are integral with the up-jacket 11. However, in such an embodiment, the circumferential lengths of the portions 9, at the up-jacket portion 11, should be selected so that the required resistance to longitudinal movement of the jacket portion 5 relative to the up-jacket portion 11 and the ease of separation of the jacket portion 5 from the up-jacket portion 11 by radially applied forces set forth hereinbefore are met. Thus, manual forces of not more than 100 pounds, and preferably, not more than 20 pounds, applied radially of the strength member 8, will cause the portions 9 to rupture at the up-jacket portion 11 and will cause the jacket portion 5 to separate from the strength member 8. On the other hand, the circumferential length of portions 9 should also be selected so that when the pulling force on the cable is up to 300 pounds, the portions 9 will not separate from the up-jacket portion 11. It has been found that such results can be obtained because the force required to rupture the portions 9, when the force is applied to the portions 9 in the direction parallel to the axis of the strength member 8, is significantly greater than the force required to rupture the portions 9 when the force is applied to the portions 9 radially of the axis of the strength member 8. The circumferential lengths of the portions 9 where they meet the up-jacket potion 11 depend upon the plastic material used and the tensile force required to rupture such material. For example, if the jacket 5 and the up-jacket 11 are both made of polyethylene, the circumferential lengths of the portions 9 at the up-jacket portion 11 can be from about 0.1 mm to about 0.5 mm.

It is not necessary that the jacket portion 5 rupture at the portions 9 at the up-jacket portion 11. The portions 9 in FIG. 9, being of the smallest circumferential length, form a line of weakening, but if desired, the line of weakening can be radially outward of the up-jacket portion 11 and circumferentially adjacent the slot on duct 7 as illustrated in FIG. 10. Thus, the portions 9 can have a circumferential length such that they will not rupture with a force sufficient to rupture the jacket portion 5 at the lines of weakening 24 and 25 which are spaced radially outwardly from the portions 9 and which provide therebetween jacket material of a circumferential length less than the circumferential length of the portions 9. Although two opposed lines of weakening 24 and 25 are shown, it will be apparent that a single line of weakening 24 or 25 can be used.

For the purpose of obtaining access to the optical fibers 6, it is important to be able to determine the circumferential positions of the slots 7, and hence, the locations of the fibers 6, from externally of the various embodiments of the cables of the invention, especially when, as in the cables of the invention, the slots 7 have an alternating hand or S-Z lay. When mid-span access is desired, it is desirable to be able to expose one, or less than all, optical fiber without exposing other optical fibers. For this reason, the cables of the invention preferably have one or more visible indicium at the outer surface of the jacket 5.

For example, the outer surface of the jacket 5 can have visible markings thereon or stripes of plastic different in color from the plastic of the remainder of the jacket 5. Thus, there can be a plurality of longitudinal markings or stripes which overlie and follow the positions of the underlying slots 7. Preferably, the indicia are physical modifications of the jacket 5, not only to identify the positions of the slots 7, but also to provide guides for tools for cutting the jacket 5. Preferably, also, the indicia provide diametrically opposite lines of weakening in the jacket 5 for providing exposure of all the optical fibers 6 at a cable end as described hereinafter.

In the preferred embodiments of the cable 3 of the invention, the jacket 5 has two diametrically opposite, longitudinal, V-shaped grooves 13 and 14 which extend inwardly from the outer surface of the jacket 5 and which throughout their lengths radially overlie, a pair of diametrically opposite slots 7 and hence, the optical fibers therein. Preferably, the bottom of each groove 13 and 14, i.e. the portion of the groove which is nearest the axis 15 of the cables, lies on a line which extends radially from the axis 15 and intersects the cores of the optical fibers 6 in the slots 7 adjacent to the grooves 13 and 14.

Although a greater number of similarly disposed grooves 13 and 14 could be used, e.g. a groove adjacent each slot 7, two grooves 13 and 14 are normally sufficient. If it is desired to distinguish one of the grooves from the other of the grooves, the groove 14 can be visibly distinguished by one or more ridges or ribs 17 and 18 extending alongside the groove 14 and extending outwardly from the jacket 5. Alternatively, or in addition, the grooves 13 and 14 can have different cross-sectional shapes, e.g. one can be V-shaped as shown and the other can be arcuate.

In all the embodiments of the cable of the invention, water or moisture blocking material can be used in, or adjacent, the slots 7 for protecting the optical fibers 6 with respect to water and moisture. Such water blocking material is well known in the art and includes water absorbing or water swellable powders, tapes and yarns, thixotropic gels and petroleum greases.

Figure 6:
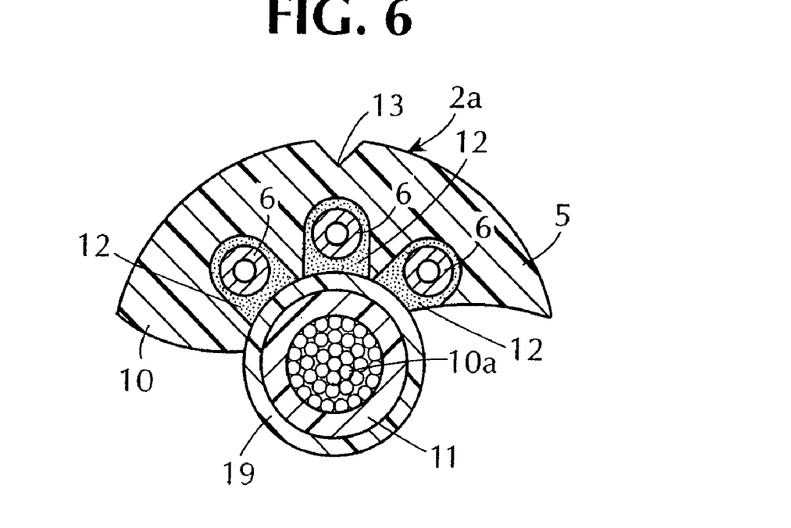
FIG. 6 is an enlarged, fragmentary cross-section of a modified form of the cable illustrated in FIG. 2.

FIG. 6 is a fragmentary, cross-sectional view of a cable 2a which is similar to the cable 2, but which has water blocking materials therein. The core 10*a* in FIG. 6 can be the same as the core 10*a* in FIG. 2 or can be twisted glass fibers or steel wires.

In FIG. 6, the core 10*a* is encircled by a plastic layer 11 which is encircled by a layer 19 of a known type of water swellable tape. In addition to or in place of, the tape layer 19, the slots 7 can contain a water blocking powder 12 of a known type, such powder 12 serving the dual function of providing moisture protection for the optical fibers 6 and of preventing sticking of the optical fibers 6 to the jacket 5.

Figure 7:
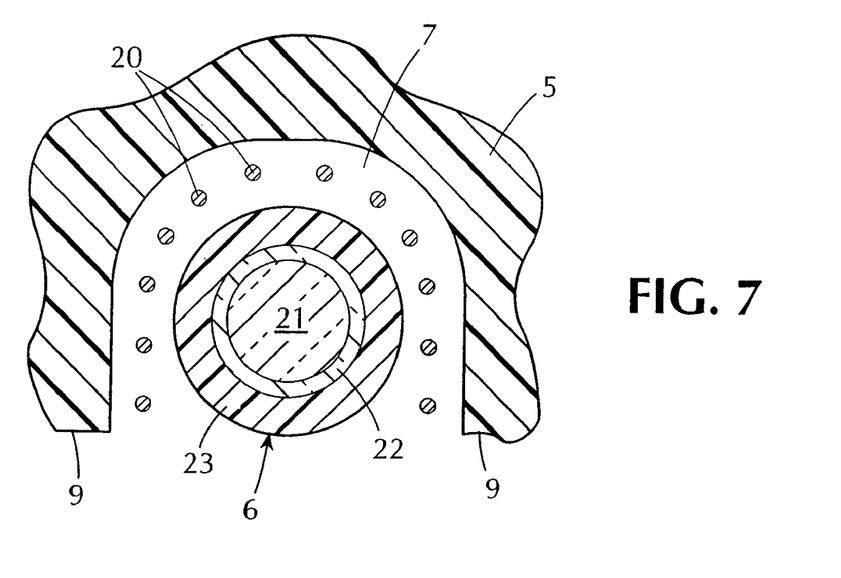
FIG. 7 is a greatly enlarged, fragmentary, cross-sectional view illustrating a jacket slot with a tight buffered optical fiber and water blocking yarns therein.

FIG. 7 is a greatly enlarged, fragmentary, cross-sectional view of a slot 7 with a tight buffered optical fiber 6 and water blocking yarns 20 therein. The yarns 20 are of a known type which absorb moisture, and the yarns 20 can be either loosely received in the slot 7 or helically wrapped around the optical fiber 6.

The tight buffered optical fiber 6 comprises a core 21 of glass, e.g. silica glass, doped or undoped, a layer or layers 22 which are normally applied by the manufacturer of the optical fiber and a buffering layer 23 of relatively soft plastic. The layer or layers 22 comprises a cladding layer of glass having an index of refraction lower than the index of refraction of the core 21.

The buffering layer 23 can include one or more layers of extruded plastic such as polyethylene, polypropylene, polyvinylchloride, nylon, ethylenevinylacetate or polyurethane.

As previously indicated, the location of an optical fiber 6 along the axial length of the cable is indicated by the grooves 13 and 14. While a greater number of grooves, one for each slot 7, can be used, it can be sufficient to use only two grooves 13 and 14 even though the number of slots 7 is greater than two because each of the slots 7 has a predetermined physical position in relation to the grooves. For example, two of the slots 7 underlie the grooves 13 and 14, and the remaining slots 7 are circumferentially spaced from the grooves 13 and 14 by known amounts. Accordingly, an optical fiber 6 can be readily accessed intermediate the ends of a cable by cutting the jacket 5 axially along a line overlying the fiber 6 and radially from the outer surface of the jacket 5 to the slot 7 containing the fiber 6 to be accessed.

Figure 8:
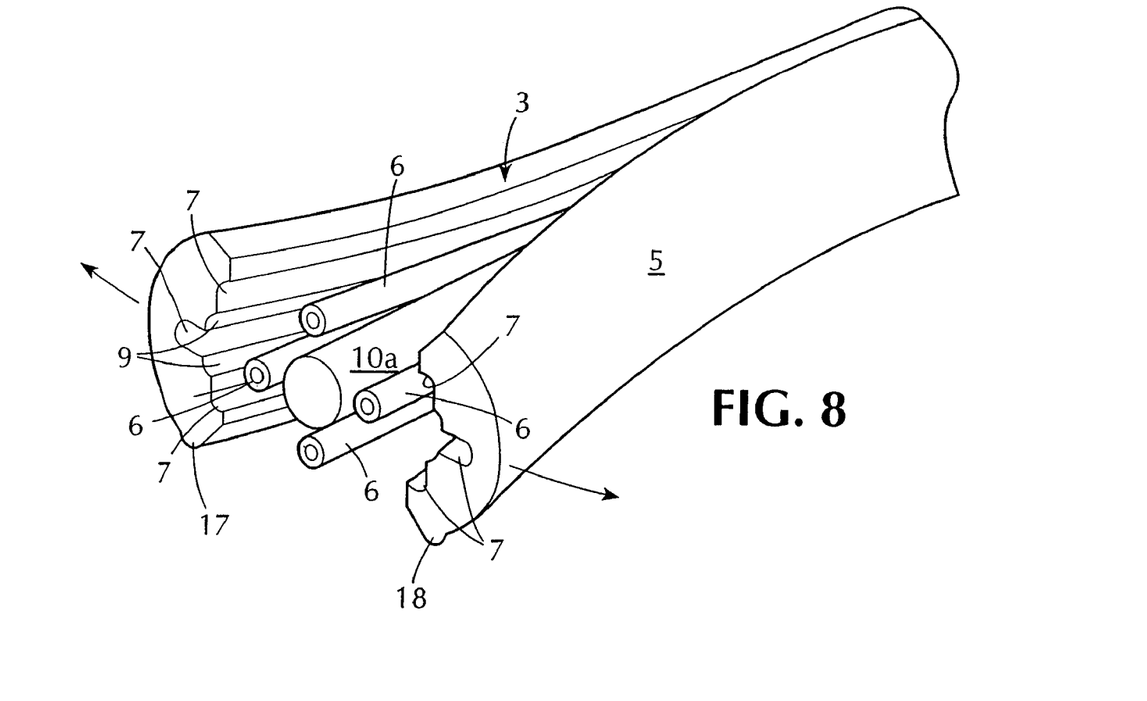
FIG. 8 illustrates in perspective the cable of FIG. 3 after the jacket has been cut at the grooves therein and the cable portions at each side of the cuts have been manually pulled away from the strength member to expose the optical fibers.

However, when a cable is to be terminated, e.g. at a terminal or rack, it is desirable to have easy and rapid access to the end portions of all the fibers 6 in the cable. Thus, as shown in FIG. 8, the jacket 5 can be axially cut along both grooves 13 and 14 and radially inwardly to the underlying slots 7, and thereafter, since the bond of the portions 9 to the strength member core 10*a* is manually frangible at the core 10*a*, the portions of the jacket 5 at opposite sides of the grooves 13 and 14 can be manually and readily pulled apart to expose the end portions of all the optical fibers 6 in the cable 3. In other words, with only two axial and radial cuts in the jacket 5, the end portions of all the optical fibers 6 in the cable can be exposed.

The structure of the cable of the invention permits a manufacturing process which is simpler than the process needed for manufacturing the stranded loose tube cable and the slotted core cable. In the process for manufacturing the cable of the invention, the jacket and the fibers are simultaneously applied to the strength member, and in the case of S-Z stranding of the fibers around the strength member, reversal of the fiber pay-off reels is not required and the fibers are precisely aligned with the slots or ducts. When the jacket bears indicia of the location of the slots or ducts, the indicia can be applied at the same time as the jacket is applied and the slots or ducts are formed, and the indicia will precisely follow the positions of the slots or ducts. The separate steps of manufacturing a slotted core before the fibers are inserted in the slots of a slotted core or manufacturing buffer tubes with fibers therein before the jacket is applied are eliminated.

Although additional steps can be used when it is convenient for a specific cable design or process, an advantage of the process for the manufacture of the cable of the invention is that the process can comprise only the following steps:

(1) Manufacture of a central strength member preferably with a plastic up-jacket but, alternatively, without such up-jacket; and (2) Feeding the strength member and optical fibers through a die, which can be rotatable for S-Z stranding, which simultaneously extrudes the jacket material over the strength member, forms the slots or ducts and inserts the fibers in the slots or ducts. If the strength member is without an up-jacket, the strength member can have an up-jacket extruded thereover before or during the extrusion of the jacket material.

The die can also apply the identifying stripes to, or form the identifying grooves in, the jacket.

Although preferred embodiments of the present invention have been described and illustrated, it will be apparent to those skilled in the art that various modifications may be made without departing from the principles of the invention.

What is claimed is:

1. An optical fiber cable having a length and a longitudinal axis, said cable comprising:
    a longitudinal strength member disposed at said axis;
    a tubular plastic jacket encircling the strength member and having a circumferentially continuous outer portion, wherein the strength member and the jacket define at least one longitudinal duct between the jacket outer portion and the strength member, and wherein the jacket includes connecting portions only at circumferentially opposite sides of the duct which provide connections to the strength member;
    wherein said connecting portions provide connections to the strength member which resist longitudinal movement of the connecting portions with respect to the strength member when the cable is subjected to pulling forces directed parallel to the axis of the cable but which connections can be interrupted by manual forces applied to the jacket and directed radially of said axis;
    wherein there is at least one longitudinally extending optical fiber in the at least one duct; and
    wherein the optical fiber in the duct is exposed upon the interruption of the connection of the jacket to the strength member at either of the circumferentially opposite sides of the duct.

2. An optical fiber cable as set forth in claim 1 wherein the pulling forces are up to 600 pounds and the manual forces are not more than 100 pounds.

3. An optical fiber cable as set forth in claim 1 wherein the connections prevent longitudinal movement of the connecting portions with respect to the strength member when said pulling forces are up to 300 pounds and the connections can be interrupted by said manual forces of not more than 75 pounds.

4. An optical fiber cable as set forth in claim 1 wherein said manual forces are not more than 20 pounds.

5. An optical fiber cable as set forth in claim 1 wherein the strength member is a high tensile strength core and the connecting portions engage the core.

6. An optical fiber cable as set forth in claim 1 wherein the strength member has a core of high tensile material encircled by a layer of plastic material which is different from the plastic material of the connecting portions, and which is intermediate the core and the connecting portions.

7. An optical fiber cable as set forth in claim 1 wherein the strength member has a core encircled by a layer of plastic material which is different from the plastic material of the connecting portions and which is intermediate the core and the connecting portions and wherein the connecting portions have a circumferential length between the outer portion of the jacket and the layer of plastic which decreases the rupture strength of such portions to not more than 100 pounds.

8. An optical fiber cable as set forth in claim 7 wherein the circumferential length is at said layer and the rupture strength is not more than 75 pounds.

9. An optical fiber cable as set forth in claim 7 wherein the circumferential length is radially spaced from said layer and circumferentially adjacent the duct.

10. An optical fiber cable as set forth in claim 7 wherein the outer protective layer is a plastic.

11. An optical fiber cable as set forth in claim 1 wherein said strength member comprises a core of high tensile material encircled by a layer of material intermediate the core and said jacket.

12. An optical fiber cable as set forth in claim 11 wherein said core comprises a material selected from the group consisting of metal and glass fibers.

13. An optical fiber cable as set forth in claim 11 wherein said layer comprises a layer of plastic.

14. An optical fiber cable as set forth in claim 11 wherein said layer comprises a water blocking material.

15. An optical fiber cable as set forth in claim 1 further comprising a water blocking material in said duct.

16. An optical fiber cable as set forth in claim 1 wherein the optical fiber is a tight buffered optical fiber having an outer protective layer.

17. An optical fiber cable as set forth in claim 1 wherein the outer surface of the jacket has at least one indicium which provides a visible indication of the position of the duct along the cable length.

18. An optical fiber cable as set forth in claim 17 wherein the jacket has a longitudinal groove extending inwardly from the outer surface of the jacket and corresponding in position to the position of the duct in the jacket and wherein said groove is said indicium.

19. An optical fiber cable as set forth in claim 17 wherein said jacket comprises at least two ducts disposed on diametrically opposite sides of said axis and wherein the jacket has at least two longitudinal grooves, one groove for each slot, which extend inwardly from the outer surface of the jacket and which correspond in positions to the positions of the slots to provide said indicia.

20. An optical fiber cable as set forth in claim 19 wherein diametrically opposite grooves have visibly different characteristics so that one of the grooves can be distinguished from the other of the grooves.

21. An optical fiber cable as set forth in claim 1 wherein the ducts have an alternating lay with respect to said axis.

22. An optical fiber cable as set forth in claim 1 wherein there is a plurality of longitudinal ducts between the jacket outer portion and the strength member, the ducts being equally spaced circumferentially of the strength member, with each pair of ducts having a connecting portion therebetween and wherein there is at least one optical fiber in at least a plurality of the ducts.

23. An optical fiber cable as set forth in claim 22 wherein the strength member has a core encircled by a layer of plastic intermediate the core and the jacket.

24. An optical fiber cable as set forth in claim 23 wherein the plastic of said layer is different from the plastic of said jacket.

25. An optical fiber cable as set forth in claim 24 wherein the plastic of one of said layer and said jacket is a polar plastic and the plastic of the other of said layer and said jacket is non-polar.

26. An optical fiber cable as set forth in claim 24 wherein the plastic of said layer has a melt temperature higher than the melt temperature of the plastic of said jacket.

27. An optical fiber cable as set forth in claim 22 wherein a pair of the ducts are disposed at diametrically opposite sides of said axis and wherein the jacket has a pair of longitudinal grooves extending inwardly of the outer surface of the jacket, one of the grooves being disposed, along its length, radially outwardly of one of the pair of ducts and the other of the grooves being disposed, along its length, radially outwardly of the other of the pair of ducts.

28. An optical fiber cable as set forth in claim 27 wherein the jacket has at least one longitudinal rib adjacent one of said grooves and at the outer surface of the jacket.

29. An optical fiber cable as set forth in claim 1 wherein the cross-sectional dimension of the duct is selected in relation to the cross-sectional dimension of the fiber or fibers in the duct so that the fiber or fibers can move longitudinally with respect to the jacket.

30. An optical fiber cable as set forth in claim 1 wherein the at least one duct extends around the strength member.

31. An optical fiber cable as set forth in claim 1 wherein the at least one duct extends helically around the strength member.

32. An optical fiber cable as set forth in claim 1 wherein the at least one duct extends in an S-Z lay configuration about the strength member.

* * * * *